L. WILLIS.
RIDING CULTIVATOR.
APPLICATION FILED MAR. 10, 1916.
1,248,231.
Patented Nov. 27, 1917.
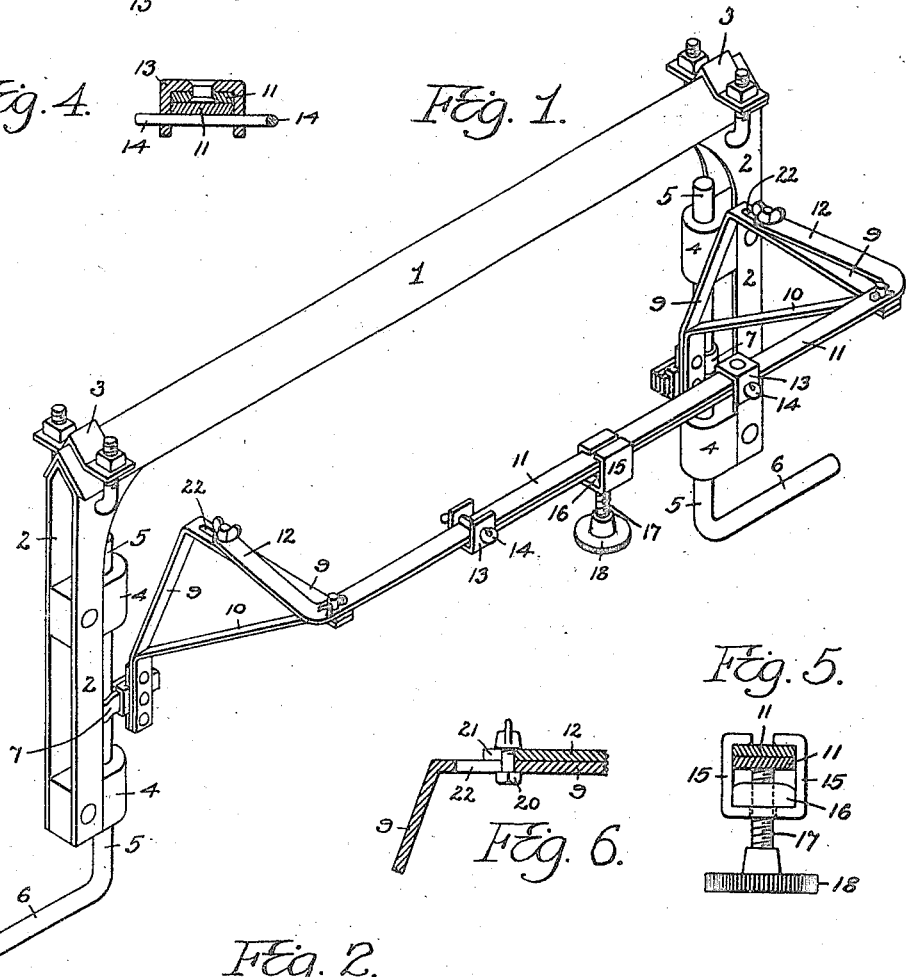

ated to the arms 9, and the bell crank
UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

RIDING-CULTIVATOR.

1,248,231.　　　　Specification of Letters Patent.　　Patented Nov. 27, 1917.

Application filed March 10, 1916.　Serial No. 83,260.

*To all whom it may concern:*

Be it known that I, LELAND WILLIS, a citizen of the United States, residing in Grenloch, New Jersey, have invented certain Improvements in Riding-Cultivators, of which the following is a specification.

My invention consists of a certain improvement in the riding cultivator for which I filed application for Letters Patent of the United States on the 25th day of October, 1915, Serial No. 57,741, the object of my present invention being to insure parallelism of the draft wheels, when the axles of the same are fixedly mounted, and to permit slight differences in the extent of lateral adjustment of the wheels to suit different conditions of operation.

This object I attain in the manner hereinafter set forth, reference being had to the accompanying drawing, in which Figure 1 is a perspective view of sufficient of a riding cultivator to illustrate my present invention;

Fig. 2 is a top view of the same, and

Figs. 3, 4, 5 and 6 are transverse sections, respectively, on the lines 3—3, 4—4, 5—5, and 6—6, Fig. 2.

In Fig. 1, 1 represents the main transverse arch bar of the cultivator which is mounted upon the wheels and carries the other members of the structure. At each end this bar has a depending leg 2 secured thereto by means of a clamp 3 so that it can be readily adjustable laterally on the bar, and each of these legs has bearings 4 for the axle post 5 whose outwardly bent lower end 6 constitutes the axle for the wheel at that side of the cultivator. Secured to each post 5 between said bearings is a clamp 7 to which is secured a forwardly projecting arm 9 usually provided with an inclined brace 10.

Upon the opposite arms 9 is mounted a connecting structure consisting of a pair of bell crank levers, each having a laterally extending arm 11 and a rearwardly extending arm 12, each of these bell crank levers being, at the angle, pivoted to the outer end of its respective arm 9.

The arm 12 of each lever extends rearwardly over said arm 9 and is susceptible of being locked thereto by means of a bolt 20 adapted to a slot 21 in the arm 12 and to a slot 22 in the arm 9, as shown in Fig. 6.

When thus locked the arms 12 are rigidly secured to the arms 9, and the bell crank levers cannot swing upon their pivots, hence the arms 9 and axles 6 must be likewise rigidly retained in position and divergent or convergent adjustment of the wheels is effectually prevented.

By slipping the bolt 20 backwardly in the slot 22 until it is free from the slot 21, and retaining the pivotal connection between the arms 9 and 11, pivotal mounting of the axles and wheels is provided for, the connecting structure swinging to right or left as the wheels are swung, the normal tendency of the swinging wheels being to assume parallel positions, whatever their angle to the line of draft.

The laterally extending arms 11 project from the arms 9 toward the center of the machine and overlap at their inner ends so as to provide for the necessary lateral adjustment of the wheel-carrying legs 2 without separating said inner ends of the arms 11 from one another.

In order to properly guide the arms 11 in their movements of adjustment in respect to one another each arm has secured to the inner end thereof a yoke 13 and the arms 11 are loosely held in contact with one another by means of cotter pins 14 passing through the sides of said yokes and each bearing upon the outer face of that arm 11 other than the one which carries the yoke, as shown in Figs. 3 and 4.

Embracing both of the overlapping arms 11 is a clip 15 provided with a nut 16 for the reception of a bolt 17 having a suitable head 18 whereby it may be turned so as to press the overlapping members 11 firmly into contact with each other and prevent accidental displacement of one in respect to the other, simple loosening of the bolt 17 permitting ready lateral adjustment of the wheel-carrying legs, and tightening of the bolt after such adjustment serving to effectually secure the arms 11 together, and thus prevent movement of one arm 9 independently of the other, the fact that the arms 11 are secured together by means of a frictional clamping device permitting very slight differences in extent of adjustment and thereby overcoming the objection to the use of a single connecting bar having at each end a row of openings to either of which a pin on the corresponding arm of the axle post can be adapted.

By preference the nut 16 is an ordinary machine nut fitting with reasonable snugness between the legs of the clip 15 and retained in position transversely by the bolt 17 which passes through an opening in the bottom member of the clip, as shown in Fig. 5, the cheapness of the clamping structure being thus insured.

I claim:

1. The combination, in a wheeled cultivator, of pivoted axle carrying posts, each having an arm projecting therefrom, bell crank levers pivoted to the projecting portions of said arms and each having a laterally projecting arm and a rearwardly projecting arm, said rearwardly projecting arms overlapping the arms on the pivot posts of the axles, means for locking said rearwardly projecting arms of the levers to or releasing them from the axle post arms, and means for retaining the laterally projecting arms of the levers in proper relation to one another.

2. The combination in a wheeled cultivator, of pivoted axle carrying posts, each having an arm projecting therefrom, bell crank levers pivoted to the projecting portions of said arms and each having a laterally projecting arm and a rearwardly projecting arm, said rearwardly projecting arms overlapping the arms on the pivot posts of the axles, locking devices adjustably mounted in slots in the projecting arms on the pivot posts and adapted to engage with or be free from corresponding slots in the ends of the rearwardly projecting arms of the levers whereby said rearwardly projecting arms may be locked to or released from said axle post arms, and means for retaining the laterally projecting arms of the levers in proper relation to one another.

In testimony whereof, I have signed my name to this specification, in the presence of two subscribing witnesses.

LELAND WILLIS.

Witnesses:
J. P. CRANSTON,
F. G. THOMAS.

Copies of this patent may be obtained for five cents each, by addressing the "Commissioner of Patents, Washington, D. C."